(12) United States Patent
Chandrashekar et al.

(10) Patent No.: US 11,881,233 B2
(45) Date of Patent: Jan. 23, 2024

(54) METHODS AND SYSTEMS FOR GENERATING MEME CONTENT

(71) Applicant: Rovi Guides, Inc., San Jose, CA (US)

(72) Inventors: Padmassri Chandrashekar, Karnataka (IN); Daina Emmanuel, Bangalore (IN); Jayshil Parekh, Karnataka (IN); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/225,764

(22) Filed: Apr. 8, 2021

(65) Prior Publication Data
US 2022/0328075 A1    Oct. 13, 2022

(51) Int. Cl.
*G11B 27/34* (2006.01)
*G06F 3/04842* (2022.01)

(52) U.S. Cl.
CPC .......... *G11B 27/34* (2013.01); *G06F 3/04842* (2013.01)

(58) Field of Classification Search
CPC ............................ G11B 27/34; G06F 3/04842
USPC .......... 386/241; 707/748; 715/230, 255, 810
See application file for complete search history.

(56) References Cited

U.S. PATENT DOCUMENTS

| | | | | |
|---|---|---|---|---|
| 9,071,814 | B1* | 6/2015 | Fan | H04N 5/91 |
| 2004/0078761 | A1* | 4/2004 | Ohanian | G11B 27/036 |
| | | | | 715/255 |
| 2009/0199230 | A1* | 8/2009 | Kumar | G06Q 30/0268 |
| | | | | 725/32 |
| 2009/0210779 | A1* | 8/2009 | Badoiu | G06F 16/7867 |
| | | | | 715/230 |
| 2012/0039539 | A1* | 2/2012 | Boiman | G11B 27/34 |
| | | | | 382/195 |
| 2012/0102021 | A1* | 4/2012 | Hill | G06F 16/7837 |
| | | | | 707/711 |
| 2013/0326406 | A1* | 12/2013 | Reiley | G06F 3/048 |
| | | | | 715/810 |
| 2015/0134673 | A1* | 5/2015 | Golan | G06F 16/44 |
| | | | | 707/748 |
| 2016/0275989 | A1* | 9/2016 | Gudjonsson | G11B 27/034 |
| 2016/0359937 | A1* | 12/2016 | Chung | H04L 65/4069 |
| 2017/0062009 | A1* | 3/2017 | Clifton | G06K 9/00765 |
| 2017/0083770 | A1* | 3/2017 | Carlson | G06K 9/46 |
| 2018/0033462 | A1* | 2/2018 | Galant | G11B 27/28 |
| 2018/0132006 | A1* | 5/2018 | Galant | G11B 27/105 |
| 2020/0279075 | A1* | 9/2020 | Avedissian | G06N 3/0445 |
| 2020/0288206 | A1* | 9/2020 | Bist | G06Q 30/02 |
| 2021/0075754 | A1* | 3/2021 | Spiry | H04L 51/20 |
| 2021/0120319 | A1* | 4/2021 | Zhou | H04N 21/4886 |

\* cited by examiner

*Primary Examiner* — Thai Q Tran
*Assistant Examiner* — Stephen R Smith
(74) *Attorney, Agent, or Firm* — Haley Guiliano LLP

(57) ABSTRACT

Systems and methods are described for generating meme content. A content item is tagged with one or more first tags based on metadata for the content item. The content item having the one or more first tags is received at user equipment. The content item is tagged with one or more second tags based on a user profile. A segment of the content item is identified based on the first and second tags. The identified segment is stored for use in generating meme content.

28 Claims, 5 Drawing Sheets

METHODS AND SYSTEMS FOR GENERATING MEME CONTENT

BACKGROUND

The present disclosure relates to methods and systems for generating meme content, and in particular, but not exclusively, to providing a user-selectable display element for accessing automatically stored content for meme generation.

SUMMARY

It is common for individuals to generate a meme based on media content. For example, a user may wish to use a particular frame or scene from a movie as the basis of a meme. In such cases, the user can screen grab the frame or record the scene, e.g., as they are watching the movie. However, the process of manually generating the meme content can be onerous. Moreover, a user may wish to generate and post memes regarding a topical portion of media content, e.g., a portion of media content that is trending, and may not be aware which portion of the media content they are consuming is popular with other users. Additionally or alternatively, a user may wish to store a portion of media content and generate a meme based on the stored portion of media content at a later time, e.g., to avoid interrupting their consumption of the media content. Further, as the trend for generating meme content continues to grow in popularity, a content provider may wish to limit the amount of meme content that is generated and/or stored relating to a portion of media content.

Systems and methods are provided herein for improving the generation of meme content. For example, systems and methods provided herein allow for the automatic storage and recommendation of one or more segments of a content item to a user for later use in meme generation, e.g., based on metadata for the content item and a user profile.

According to some examples, a content item is tagged with one or more first tags based on metadata for the content item. In some examples, the one or more first tags may be added by a content provider, e.g., prior to transmission of the content item. The content item having the one or more first tags is received at user equipment. The content item is tagged with one or more second tags based on a user profile, e.g., at the user equipment. For example, the one or more second tags may be added to the content item based on the user profile and/or the one or more first tags. A segment of the content item is identified based on the first and second tags. The identified segment may be one that is of interest to the user, e.g., based on information from the user profile. The identified segment is stored, e.g., for use in generating meme content. For example, a user may access the stored segment, e.g., after viewing the content item, and modify the stored segment for use in meme content.

In some examples, the content item is generated for display, the content item having a progress bar comprising a user-selectable display element corresponding to the position of the identified segment in the content item. The selection of the display element by a user may cause the identified segment to be stored, e.g., on user equipment and/or on a remote storage module.

In some examples, the display element displays information based on at least one of the metadata for the content item and the user profile. For example, the display element may display first information based on a first tag and may display second information based on the user profile.

In some examples, one or more user inputs at the user equipment relating to a playback operation of the content item are determined. Data may be stored in the user profile relating to the one or more user inputs. For example, data relating to when a user performed a playback operation whilst watching a content item may be stored in storage of user equipment.

In some examples, one or more user reactions during playback of the content item may be determined. For example, user equipment may be configured to monitor one or more physical characteristics of a user, such as facial expressions, whilst a user is viewing the content item. The user profile may store data relating to the one or more user reactions, which may be used when adding the first and/or second tags to the content item.

In some examples, the content item may be tagged with one or more third tags based on the metadata for the content item. Storage of the identified segment may be restricted where it contains one or more third tags. In some examples, the metadata for the content item may indicate how many times a meme has been generated based on a segment of the content item. Additionally or alternatively, the metadata may indicate that the identified segment contains restricted content, such as adult content or an advertisement.

In some examples, data may be transmitted to a content provider data indicating the start and end points of the identified segment. Upon identifying a segment of the content item based on the first and second tags, a recording of the identified segment may be transmitted, e.g., automatically transmitted, to storage. In some examples, the identified segment may be accessed from storage at the user equipment.

According to some examples of the systems and methods provided herein a content item is received having at least one primary tag. A segment of the content item corresponding to at least one primary tag of the content item is identified. The identified segment is tagged with one or more secondary tags based on a user profile to identify a portion of the identified segment that is of interest to the user. A content guidance application generates for display a progress bar indicating the position of the one or more secondary tags in the content item. The portion of the identified segment is stored, e.g., automatically and/or upon user selection.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
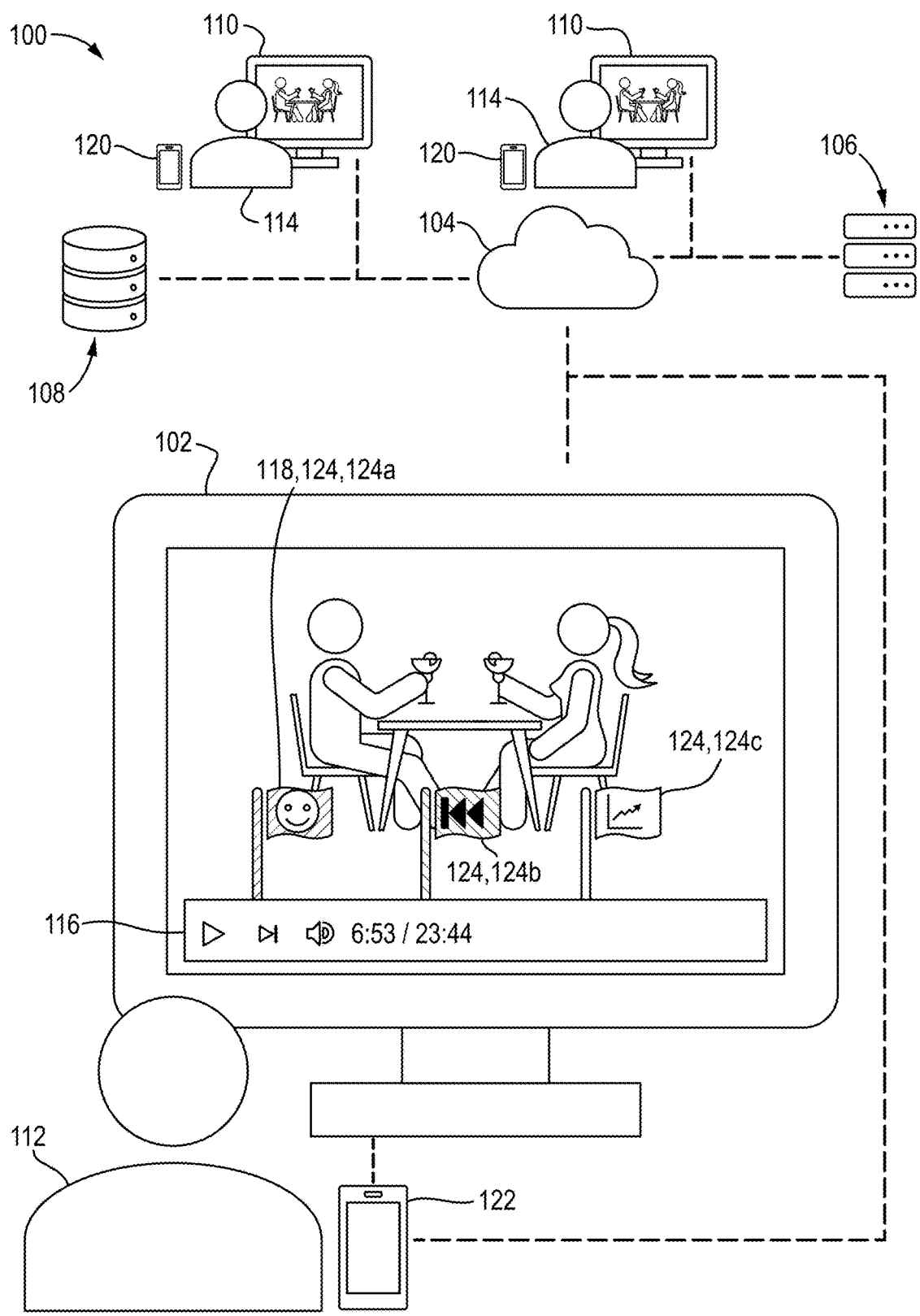
FIG. 1 illustrates an overview of a system for generating meme content, in accordance with some examples of the disclosure.

FIG. 1 illustrates an overview of a system 100 for generating meme content, in accordance with some examples of the disclosure. In some examples, system 100 includes user equipment 102, such as a tablet computer, a smartphone, a smart television, or the like, configured to display media content to a user. System 100 may include network 104, such as the Internet, configured to communicatively couple user equipment 102 to one or more servers 106 and/or one or more content databases 108 from which media content may be obtained for display on the user equipment 102. User equipment 102 and server 106 may be communicatively coupled to one another by way of network 104, and server 106 may be communicatively coupled to content database 108 by way of one or more communication paths, such as a proprietary communication path and/or network 104. System 100 may include one or more other user equipment 110 communicatively coupled to user equipment 102, network 104, server 106 and/or content database 108.

In some examples, system 100 may comprise an application that provides guidance through an interface, e.g., a graphical user interface, that allows users to efficiently navigate media content selections, easily identify media content that they may desire, such as content provided on a database on one or more live streams, and allow the user to navigate within selected media content, e.g., by virtue of a progress bar having one or more selectable options. Such guidance is referred to herein as an interactive content guidance application or, sometimes, a content guidance application, a media guidance application, or a guidance application. In some examples, the application may be configured to highlight one or more portions of a media content item during playback, e.g., on a progress bar, that a user may wish to consider for use in generating meme content.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset", "content items" and "content" should each be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, random access memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user equipment," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, subtitle data, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
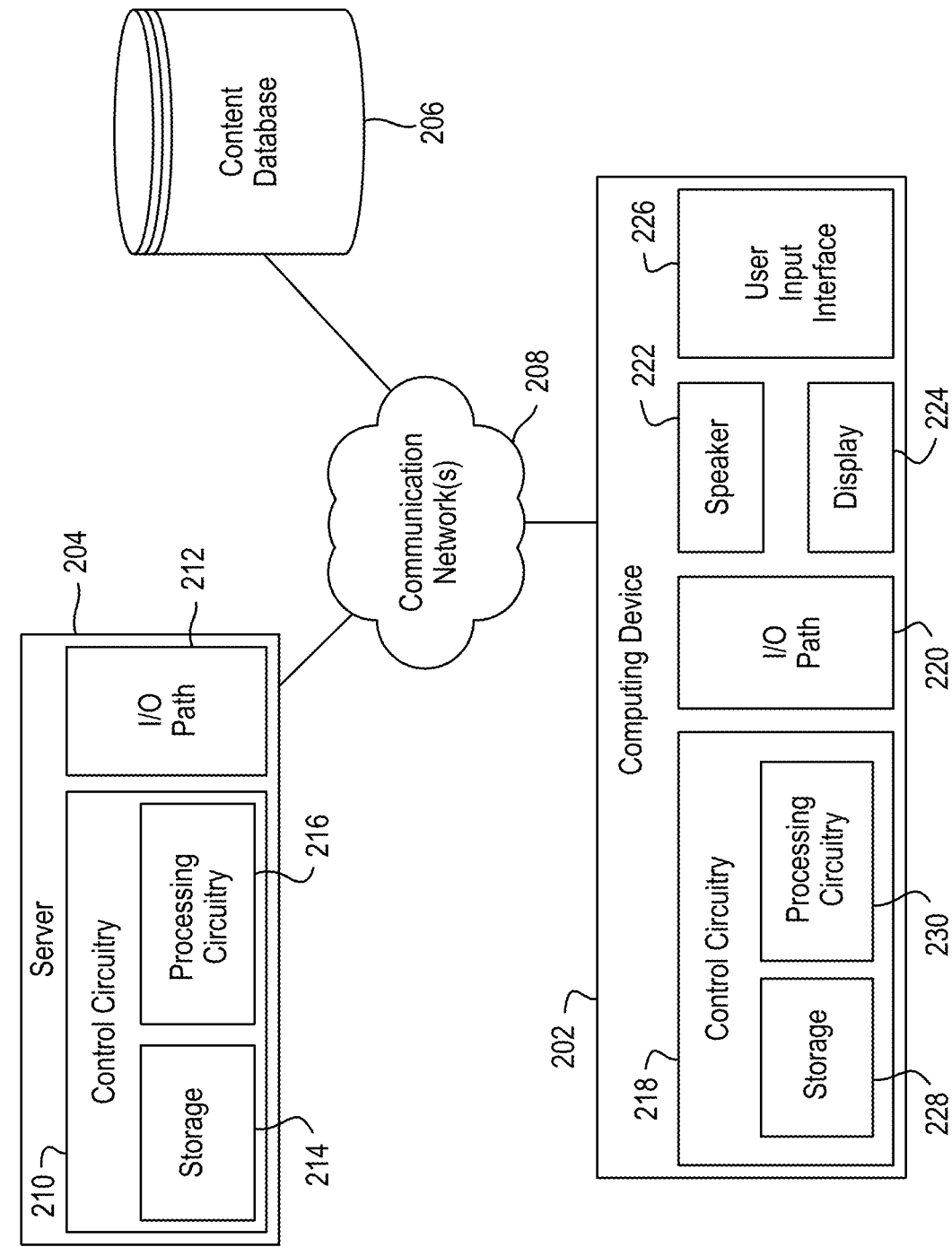
FIG. 2 is a block diagram showing components of an exemplary system for generating meme content, in accordance with some examples of the disclosure.

FIG. 2 is an illustrative block diagram showing exemplary system 200 configured to provide modified subtitles for display to a user while consuming media content. Although FIG. 2 shows system 200 as including a number and configuration of individual components, in some examples, any number of the components of system 200 may be combined and/or integrated as one device, e.g., as user equipment 102. System 200 includes computing device 202, server 204, and content database 206, each of which is communicatively coupled to communication network 208, which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which may be a personal computer, a laptop computer, a tablet computer, a smartphone, a smart television, a smart speaker, or any other type of computing device, includes control circuitry 218, I/O path 220, speaker 222, display 224, and user input interface 226, which in some examples provides a user selectable option for enabling and disabling the display of modified subtitles. Control circuitry 218 includes storage 228 and processing circuitry 230. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions, e.g., to request modified subtitles, to control circuitry 210 and/or 218 using user input interface 226. User input interface 226 may be any suitable user interface, such as a remote control (e.g., remote control 114), trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

Figure 3:
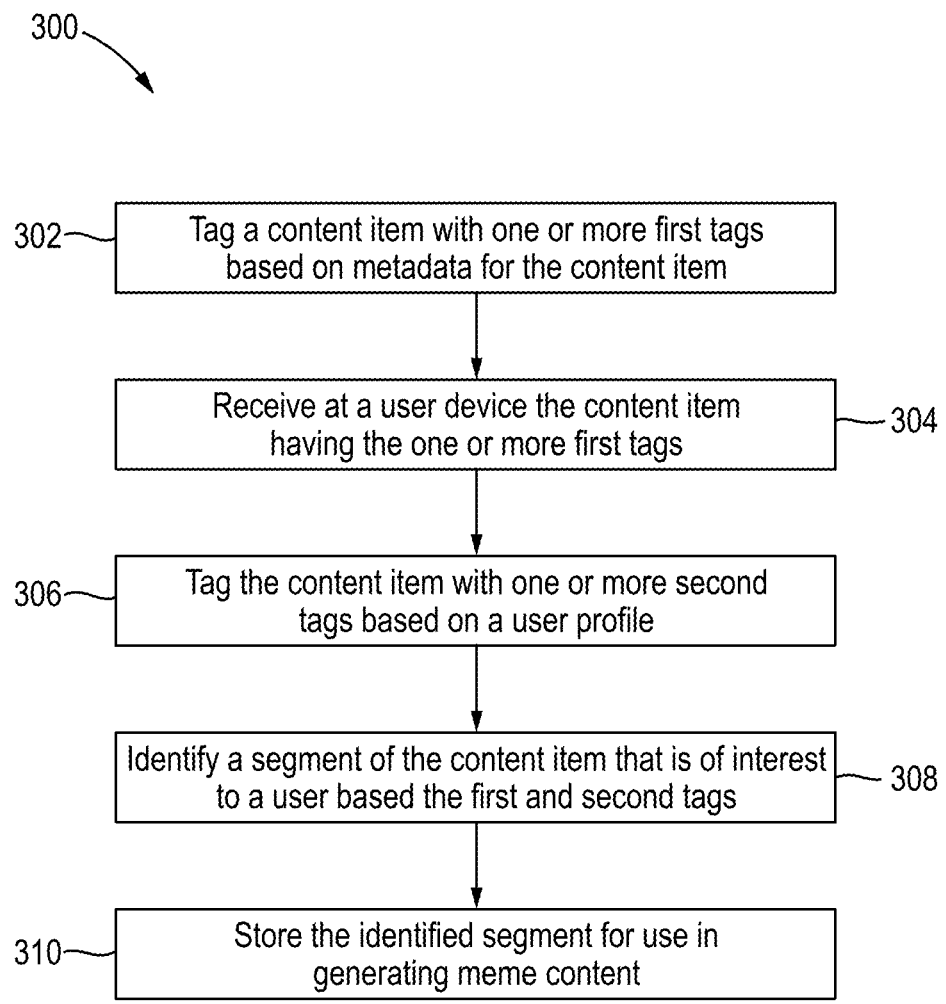
FIG. 3 is a flowchart representing a process for generating meme content, in accordance with some examples of the disclosure.

FIG. 3 is a flowchart representing an illustrative process 300 for generating meme content, in accordance with some examples of the disclosure. Whilst the example shown in FIG. 3 refers to the use of system 100, as shown in FIG. 1, it will be appreciated that the illustrative process shown in FIG. 3, and any of the other following illustrative processes, may be implemented on system 100 and system 200, either alone or in combination, or on any other appropriately configured system architecture.

At step 302, a content item is tagged with one or more first tags based on metadata for the content item. For example, control circuitry, e.g., control circuitry of server 106, may access metadata for a content item and tag one or more portions of the content item based on the metadata. The content item metadata may be provided by a content provider, e.g., the metadata may include data transmitted as part of streamed media content and/or as part of a live stream or broadcast, from data stored on memory of user equipment, e.g., user equipment 102, and/or any other appropriate storage module, such as a storage module on a server of a content provider. In some examples, control circuitry may tag a portion of the content item with one or more first tags to indicate the content of a particular frame or scene of the content item. For example, where the content item is a movie of a certain genre, such as a comedy, control circuitry may use the metadata to tag a frame or scene as relating to a comedic moment in the movie. In some examples, the first tags may relate to objective data, such as the actor in a particular scene or a location at which a scene was set/filmed. Additionally or alternatively, the first tags may relate to subjective data, such as whether a particular scene is funny. For example, the metadata for the content item may be based on one or more user reactions to the content item, or one or more scenes within the content item. In some examples, control circuitry may be configured to determine the popularity of a content item, e.g., whether the content item, a portion of the content item, or an individual, e.g., an actor, or other article in the content item is currently popular or widely discussed online, especially on social media websites (i.e., trending). In some examples, it is beneficial to add first tags to the content item, e.g., highlighting portions of metadata, since the metadata may not be organized in any particular manner and, by itself, may not provide any discernable insight into the content of the content item. In some examples, the one or more first tags are added to a content item by a content provider and/or a service provider, e.g., based on one or more requests of a user and/or a user profile. For example, a user may request, and/or a user profile may indicate, that first tags should be added to a content to indicate scenes that contain comedic content, and/or any other appropriate content.

At step 304, the content item is received at user equipment, the content item having the one or more first tags added to the content item. In the example shown in FIG. 1, user 112, e.g., a primary user, is watching a content item on user equipment 102. In addition, one or more other users, e.g., secondary users 114, may be watching the content item, or may have watched at least a portion of the content item, on respective user equipments 110. In this manner, metadata, and thus the first tags, for the content item can be updated, e.g., in real time, if a secondary user 114 reacts to the content, such as by "liking" a particular scene. In some examples, the first tags may be transmitted from the content provider along with the content item. Additionally or alternatively, the tags may be sent independently from the content item and added to the content item when received by the user equipment 102.

At step 306, the content item is tagged with one or more second tags based on a user profile, e.g., using control circuitry of the user equipment 102. For example, a user profile may store data relating to user preferences, user viewing history, user input history, e.g., inputs into user equipment 102 to control playback of a content item, and/or one or more user reactions to a content item, e.g., whether a user laughed whilst watching a particular scene in a movie, as discussed below in further detail in relation to FIG. 4. In some examples, the second tags may be added based on a user's preference for a particular genre of content, e.g., comedy. As such, control circuitry may be configured to add a second tag to a portion of media content that has previously been tagged with a first tag relating to comedic content, e.g., a first tag based on metadata compiled based on an action of one or more secondary users 114. Additionally or alternatively, control circuitry may add a second tag based on a user's preferences, e.g., preferences for a particular genre of content and/or a particular actor, to a portion of media content that has previously been tagged with a first tag relating to comedic content and/or as containing the particular actor.

At step 308 a segment of the content item that is of interest to a user is identified based on the first and second tags. For example, control circuitry of the user equipment 102 may identify a segment of media content that has previously been tagged with a first tag, and then a second tag that has been added within the segment tagged by the first tag. However, identification of the segment may be achieved in any appropriate manner. For example, the first tag may define the start and end points of a comedic portion of media content, e.g., based on metadata compiled based on an action of one or more secondary users 114, and a second tag may define the start and end points of a segment of that comedic portion, e.g., a segment of the comedic portion that contains an actor identified as a user's preferred actor by data in the user profile. In this manner, control circuitry is configured to identify a segment of media content that a user may wish to use for generating meme content based on the metadata for the content item and a user preference, e.g., in a hierarchical manner. Moreover, by adding a user-specific second tag on top of a more generic first tag, a higher level of granularity can be achieved when identifying a portion of content that a user may wish to use for meme generation. Such a tagging method is beneficial as it allows for the more generic tags to be applied by a content provider, since the content identified by the first tags is not specific to user 112, and more specific tags for user 112 to be applied to the content item by user equipment 102, e.g., as user 112 is watching the content item. Such a tagging methodology may be useful as it does not disturb user 112 whilst watching the content item.

In some examples, the segment of interest may be indicated on a progress bar 116 of a media guidance application, e.g., as a user is watching and/or navigating through the media content. In some examples, a display element 118, such as a flag, may indicate to user 112 the location of the identified segment in the media content. Further details of the use of the display elements is described below in relation to FIG. 4.

At step 310 the identified segment is stored for use in generating meme content. In some examples, control circuitry of user equipment 102 may cause the recording, e.g., clipping, and storage of the identified segment, e.g., on a storage module of user equipment 102. Additionally or alternatively, control circuitry of user equipment 102 may transmit to the content provider information regarding the identified segment, e.g., the start and end points of the identified segment, so that the content provider can clip and store the identified segment, e.g., on a cloud based storage module that the user can access at a later point in time. In some examples, clipping and storage of the identified segment may happen automatically, e.g., without any input by the user. For example, the storage of the identified segment may happen in the background whilst a user is watching the content item, such that when the user choses to finish viewing the content item, portions of media content that the user may find interesting can be accessed by the user for use in meme generation, e.g., at a later point in time. Such a method is beneficial as the user need not manually clip and store portions of interest when generating meme content.

The actions or descriptions of FIG. 3 may be used with any other example of this disclosure, e.g., the example described below in relation to FIG. 4. In addition, the actions and descriptions described in relation to FIG. 3 may be done in any suitable alternative orders or in parallel to further the purposes of this disclosure.

Figure 4:
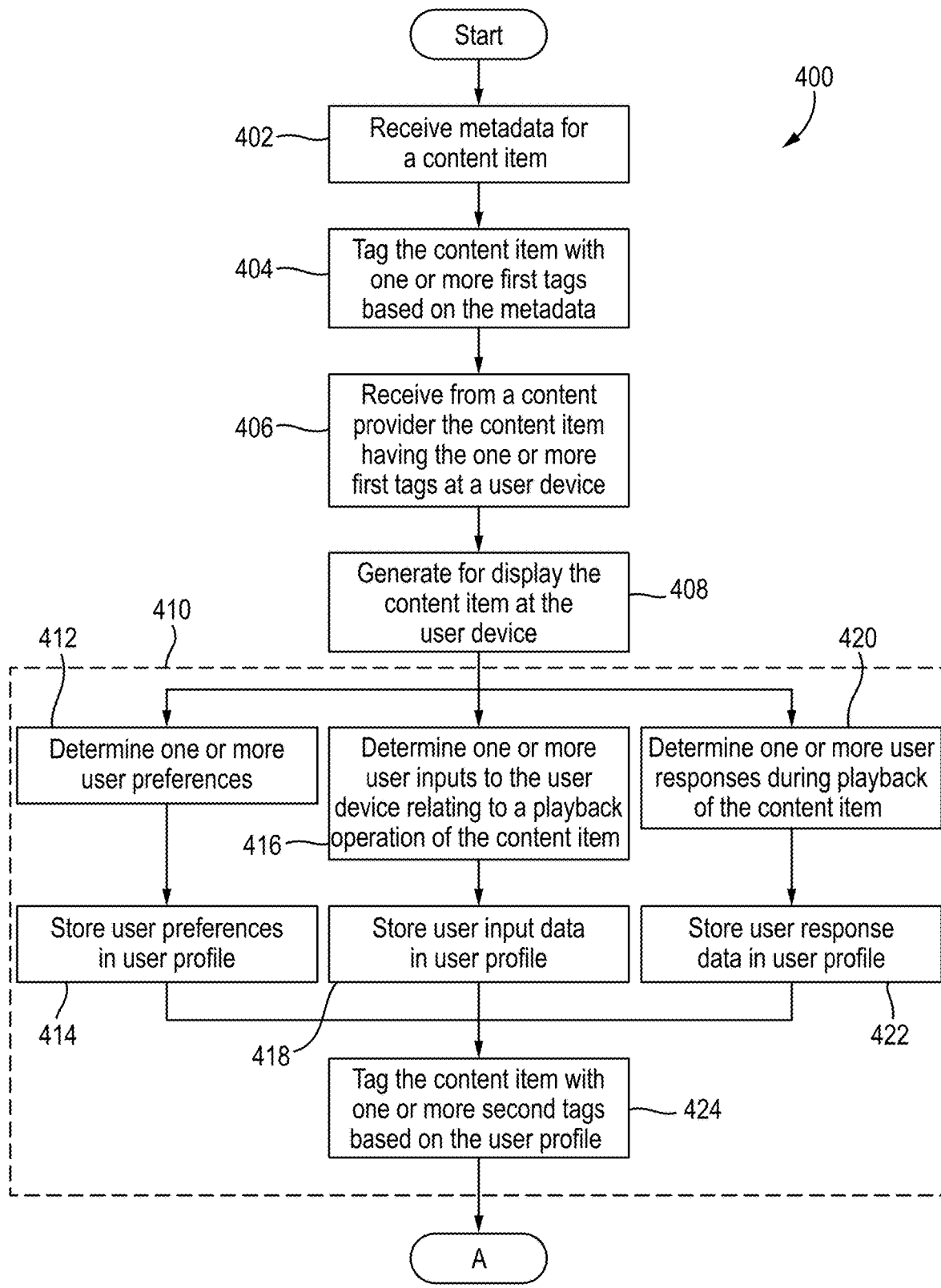
FIG. 4 is a flowchart representing a process for storing a portion of media content for use in generating meme content, in accordance with some examples of the disclosure.
Figure 4:
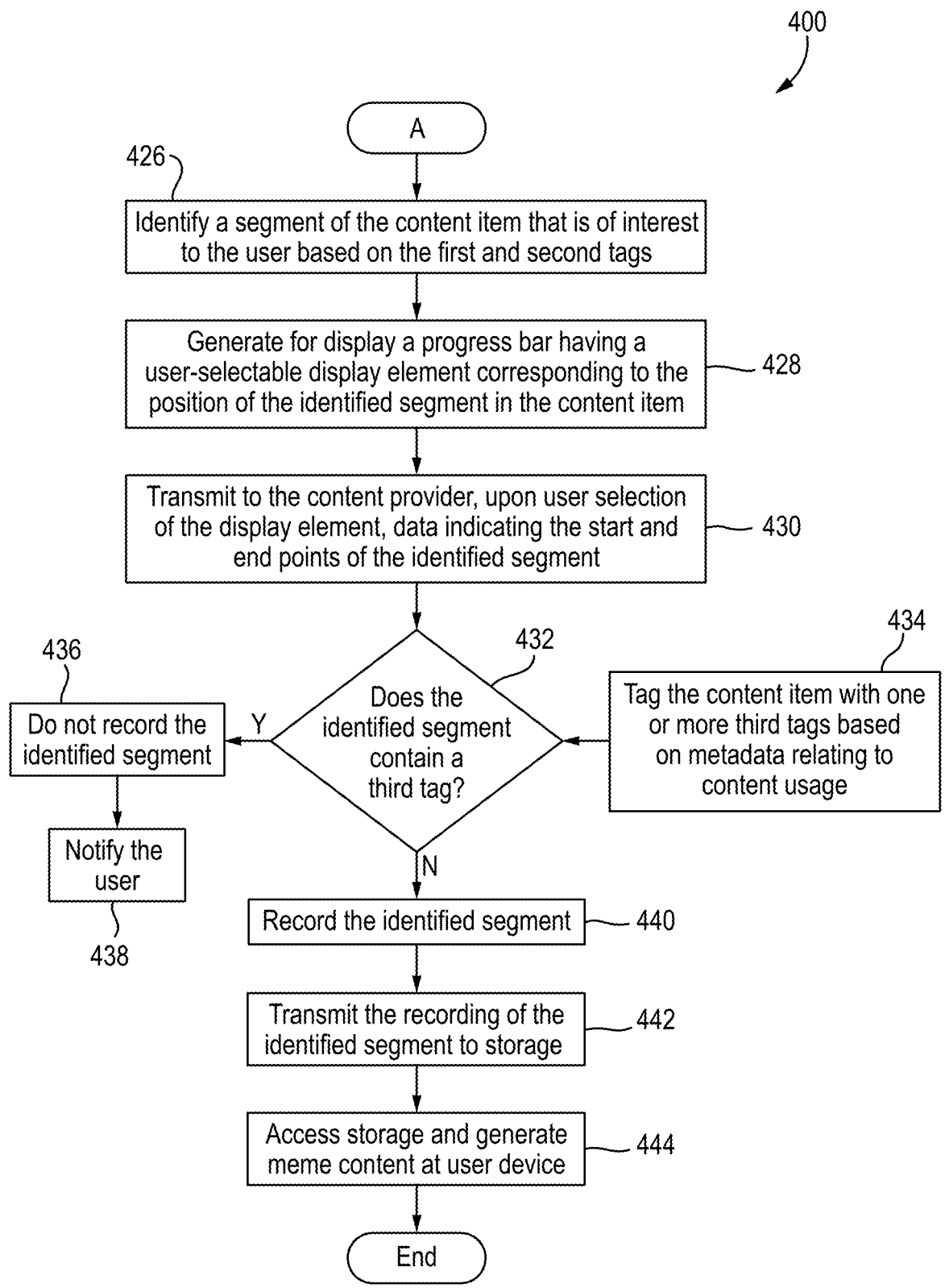

FIG. 4 show a flowchart representing an illustrative process 400 for storing a portion of media content for use in generating meme content. Whilst the example shown in FIG. 4 refers to the use of system 100, as shown in FIG. 1, it will be appreciated that the illustrative process shown in FIG. 4 may be implemented on system 100 and system 200, either alone or in combination, or on any other appropriately configured system architecture.

At step 402, control circuitry receives metadata for a content item. For example, metadata for a content item may be received by a content provider from one or more sources, such as from the producer of the content item and/or one or more users with access to the content item. In some examples, the content provider may create metadata for the content item and send it to control circuitry. In some examples, where one or more users with access to the content item at least partially generate the metadata for the content item, control circuitry may be configured to determine one or more user actions, e.g., a user input, such as a playback operation, creation of a user rating, or the posting of a review, into user equipment, such as user equipment 110 and/or mobile user equipment 120. Additionally or alternatively, control circuitry may be configured to determine one or more user reactions to the content item, e.g., as it is being viewed. For example, user equipment, such as user equipment 110 and/or mobile user equipment 120, may be configured to monitor a user's facial expression whilst they view content, e.g., using a camera and image processing circuitry. Metadata may be generated in response to the determination of one or more user actions and/or reactions, e.g., to indicate a user response to one or more portions of the content item.

At step 404, the content item is tagged with one or more first tags based on the metadata, e.g., in a similar manner to step 302 of FIG. 3. For example, a content provider may receive metadata generated by a user with access to the content item to indicate how the user responded to various portions of the content item, such as by liking a portion on a social media platform, laughing at a portion of the content item, and/or generating a meme from a portion of the content item. As such, the content provider may include one or more first tags in the content item relating to the response of one or more users to the content item. Additionally or alternatively, the content provider may include one or more first tags relating to the content displayed in a scene or frame of the content item, such as an actor, a landmark and/or a location.

At step 406, the content item having the one or more first tags is received at user equipment, e.g., in a similar manner to step 304 of process 300. For example, process 400 may comprise a step of transmitting the content item over communications network 104, e.g., using control circuitry.

At step 408, the content item is generated for display at user equipment 102 and/or mobile user equipment. For example, user equipment 102 may display the content item on user equipment 102 and a media guide application on mobile user equipment 122.

At step 410, control circuitry causes one or more types of data to be stored in a user profile. For example, at step 412 control circuitry accesses data relating to one or more user preferences, such as a preference for a particular genre of movie and/or a particular actor. User preference data may be accessed from data input by the user. For example, a user may input, or otherwise select, their preference information into a database. Additionally or alternatively, control circuitry may monitor one or more user communications to determine a user preference, e.g., based on a frequency of a particular topic occurring in their communications, such as an actor and/or a movie. At step 414, control circuitry causes storage of user preference data in the user profile.

At step 416, control circuitry determines one or more user inputs to the user equipment (and/or mobile user equipment 122) relating to a playback operation of the content item. For example, control circuitry may determine when a user performed a rewind operation of a particular segment of the content item and re-watched that segment. Additionally or alternatively, control circuitry may determine when a user skipped a segment of a content item, or skipped forward to the next episode in a series of episodic content. Control circuitry may be configured to log the user input and add a time stamp to the logged input, e.g., so that the user input can be matched to a particular scene or frame in the content item. At step 418, control circuitry causes storage of user input data in the user profile.

At step 420, control circuitry determines one or more user responses during playback of the content item, e.g., one or more responses of user 112 may be determined in a similar manner to the one or more responses of user(s) 114, as described above in relation to step 402. In particular, user equipment 102 and/or mobile user equipment 122 may be configured to monitor the body language of user 112 during playback of the content item, such as when user 112 laughs at a portion of a content item or disregards a portion of a content item. Control circuitry may be configured to log the user response and add a time stamp to the logged reaction, e.g., so that the user reaction can be matched to a particular scene or frame in the content item. Such methodology applies equally to the determination of the reaction of user(s) 114 in step 402. At step 422, control circuitry causes storage of user response data in the user profile.

At step 424, control circuitry tags the content item with one or more second tags based on the user profile. For example, control circuitry may add a second tag to a particular scene of the content item based on user input data indicating that the user performed a playback operation during that scene. Additionally or alternatively, control circuitry may add a second tag to a particular scene of the content item based on user response data indicating that the user reacted in a particular manner during a scene. Additionally or alternatively, control circuitry may add a second tag to a particular scene of the content item based on the user's preference for the content of the scene, such as the scene containing a certain actor.

At step 426, control circuitry identifies a segment of the content item that is of interest to the user based on the first and second tags, e.g., in the same or similar manner to step 308 of process 300. For example, a first tag may be added by a content provider based on metadata, such as where a scene of a content item contains a certain actor and where one or more other users 114 reacted in a positive manner to that scene, e.g., by positively rating the scene on social media. In this manner, the content provider is able to indicate, by virtue of the first tag, the start and end point of a segment of the content item that contains a scene having a certain actor and where that scene is popular with the viewing community, e.g., based on an action and/or reaction of one or more other users 114. Control circuitry, upon identification of a first tag, identifies a second tag, e.g., within the segment identified by the first tag, based on data in the user profile. For example, control circuitry may determine that the segment identified by the first tag contains a second tag that has been added based on a user response to the content item whilst user 112 views the content item, such as where user 112 laughs at a particular scene. In this manner, control circuitry can identify a segment of the content item that is of interest to the user, e.g., a segment of the content item that user 112 may wish to use for generation of meme content, based on the first and second tags, since that segment shows correlation between the type of content (e.g., comedic), the response of one or more other users 114, and the response of user 112.

At step 428, control circuitry generates for display a progress bar 116 having a user-selectable display element 124 corresponding to the position of the identified segment in the content item. In the example shown in FIG. 4, progress bar 116 show three user-selectable display elements 124 corresponding to respective segments of the content item that have been marked as of potential interest to user 112. In some examples, each of the user-selectable display elements 124 may be customized based on user preference data and/or metadata for the content item. For example, user-selectable display element 124a comprises a flag having a first icon indicating that the identified segment contains content to which user 112 had a positive response, user-selectable display element 124b comprises a flag having a second icon indicating that the user performed a rewind operation whilst watching the identified segment, and user-selectable display element 124c comprises a flag having a third icon indicating that the identified segment contains content that is currently trending, e.g., on social media. In some examples, user-selectable display elements 124 may be color-coded (or otherwise identifiable) based on the type of content they identify. For example, user-selectable display element 124a may be a first color indicating a first type of content, e.g., comedic content, and each of the other user-selectable display elements 124b, 124c may be a different color indicating a different type of content, e.g., romantic content and action content respectively.

At step 430, control circuitry transmits to the content provider, upon user selection of the display element, data indicating the start and end points of the identified segment. However, in some examples, additionally or alternatively, control circuitry may transmit, e.g., automatically, to the content provider data indicating the start and end points of the identified segment without any input by the user. The data indicating the start and end points of the identified segment may indicate the exact portion of a scene that contains a preferred actor of user 112 and to which one or more other users 114 had a positive response. In this manner, the content provider is made aware of the exact portion of the content item in which user 112 may have interest, e.g., for use in generation of meme content.

At step 430, control circuitry determines if the identified segment contains a third tag. In the example shown in FIG. 4, one or more third tags are added at step 432, such that control circuitry is able to determine whether the identified segment contains a third tag. However, it is appreciated that the one or more third tags can be added at any stage in process 400, e.g., by the content provider or by the producer of the content item, and adding of the one or more third tags is not limited to the order of steps shown in FIG. 4. The one or more third tags may be based on metadata relating to content usage. For example, content usage may relate to how many times meme content has been generated based on a particular segment of the content item. For example, a content provider may wish to limit, or restrict entirely, the number of memes generated from a segment of a content item, e.g., based on an age-based restriction of the content item and/or the age of user 112. Additionally or alternatively, content usage may relate to restrictions on usage of the content item, e.g., specific restrictions on the usage of the identified segment. For example, a content provider may wish to prevent meme content being generated from certain types of content, such as commercial content and/or adult content. In some examples, metadata for the content item may indicate any such (or similar) restrictions and/or limitations. In this manner, one or more third tags may be added to the content item, e.g., one or more segments of the content item, to indicate that there is restriction/limitation on usage of the content item.

Returning to step 430, where control circuitry determines that the identified segment contains a third tag, process 400 moves to step 434, where control circuitry prevents a recording from being made of the identified segment. In some examples, such as in process 300, control circuitry may transmit instructions to user equipment 102 to prevent user equipment from recording, e.g., clipping, the identified segment.

At step 436, control circuitry causes a notification to be sent to user 112 that one or more restrictions and/or limitations are in place on usage of the segment of interest. The notification may contain details on the restrictions and/or limitations, which may suggest to user 112 a similar segment that does not have a restriction and/or limitation in place on usage of the segment for meme generation. However, in some examples, determination of whether the identified segment contains a third tag may be made prior to the display of a user-selectable display icon relating to the identified segment, e.g., before step 424 or step 428. In this manner, control circuitry may prevent the identified segment from being displayed on progress bar 116, e.g., such that the segment of interest is not identified as selectable for meme generation. In some examples, a third tag may indicate that specific restrictions on the usage of the identified segment may be circumvented where the content provider or content producer is credited. As such, notification may be sent to the user that any usage restriction can be removed by accrediting the content provider or content producer when generating meme content based on the identified segment.

Returning to step 430, where control circuitry determines that the identified segment does not contain a third tag, process 400 moves to step 438, where control circuitry causes the identified segment to be recorded, e.g., clipped. The recording of the identified segment may be enabled by the start and end points indicated by the second tag.

At step 440, control circuitry transmits the recording of the identified segment to a storage module. For example, control circuitry may transmit the clipped segment of interest to a cloud-based storage module for access by user equipment 102. Additionally or alternatively, control circuitry may transmit the clipped segment of interest to, e.g., directly to, user equipment 102. In some examples, user 112 may receive a notification when one or more segments of interest have been stored and are accessible, e.g., for use in meme generation.

At step 442, storage is accessed and the recording of the identified segment is retrieved, e.g., so that user 112 can modify the recording of the identified segment for use as meme content.

The actions or descriptions of FIG. 4 may be used with any other example of this disclosure. In addition, the actions and descriptions described in relation to FIG. 4 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating meme content comprising:
    tagging a content item with one or more first tags and one or more third tags based on metadata for the content item;
    receiving at user equipment the content item having the one or more first tags and the one or more third tags;
    subsequently tagging the content item with one or more second tags at the user equipment based on a user profile, wherein the one or more second tags are added to the content item concurrently with delivery of the content item to the user equipment;
    identifying a segment of the content item based on the first and second tags;
    determining whether the segment of the content item includes the one or more third tags;
    in response to determining the segment of the content item does not include the one or more third tags, storing the identified segment for use in generating meme content, wherein meme content comprises a message, and wherein the metadata for the content item indicates a popularity of memes that have been generated based on the segment of the content item; and
    in response to determining the segment of the content item includes the one or more third tags, preventing storage of the identified segment for use in generating meme content based on the one or more third tags indicating restricted content.

2. The method of claim 1, the method comprising generating for display a progress bar having a user-selectable display element corresponding to a position of the identified segment in the content item, wherein selection of the display element by a user causes the identified segment to be stored.

3. The method of claim 2, wherein the display element displays information based on at least one of the metadata for the content item and the user profile.

4. The method of claim 1, the method comprising:
    determining one or more user inputs at the user equipment relating to a playback operation of the content item; and
    storing data in the user profile relating to the one or more user inputs.

5. The method of claim 1, the method comprising:
    determining one or more user reactions during playback of the content item; and
    storing data in the user profile relating to the one or more user reactions.

6. The method of claim 1, the method comprising transmitting to a content provider data indicating start and end points of the identified segment.

7. The method of claim 1, the method comprising:
    upon identifying the segment of the content item based on the first and second tags, transmitting a recording of the identified segment to storage; and
    accessing from storage the identified segment at the user equipment.

8. A system for generating meme content, the system comprising:
    memory;
    control circuitry configured to:
        tag a content item with one or more first tags and one or more third tags based on metadata for the content item;
        receive at user equipment the content item having the one or more first tags and the one or more third tags;
        subsequently tag the content item with one or more second tags at the user equipment based on a user profile, wherein the one or more second tags are added to the content item concurrently with delivery of the content item to the user equipment;
        identify a segment of the content item based on the first and second tags;
        determine whether the segment of the content item includes the one or more third tags;
        in response to determining the segment of the content item does not include the one or more third tags, store the identified segment in the memory for use in generating meme content, wherein meme content comprises a message, and wherein the metadata for the content item indicates a popularity of memes that have been generated based on the segment of the content item; and
        in response to determining the segment of the content item includes the one or more third tags, prevent storage of the identified segment for use in generating meme content based on the one or more third tags indicating restricted content.

9. The system of claim 8, wherein the control circuitry is configured to generate for display a progress bar having a user-selectable display element corresponding to a position of the identified segment in the content item, wherein selection of the display element by a user causes the identified segment to be stored.

10. The system of claim 9, wherein the display element displays information based on at least one of the metadata for the content item and the user profile.

11. The system of claim 8, wherein the control circuitry is configured to:

determine one or more user inputs at the user equipment relating to a playback operation of the content item; and
store data in the user profile relating to the one or more user inputs.

12. The system of claim 8, wherein the control circuitry is configured to:
    determine one or more user reactions during playback of the content item; and
    store data in the user profile relating to the one or more user reactions.

13. The system of claim 8, wherein the control circuitry is configured to transmit to a content provider data indicating start and end points of the identified segment.

14. The system of claim 8, wherein the control circuitry is configured to:
    upon identifying the segment of the content item based on the first and second tags, transmit a recording of the identified segment to storage; and
    access from storage the identified segment at the user equipment.

15. A system for generating meme content, the system comprising:
    means for tagging a content item with one or more first tags and one or more third tags based on metadata for the content item;
    means for receiving at user equipment the content item having the one or more first tags and the one or more third tags;
    means for subsequently tagging the content item with one or more second tags at the user equipment based on a user profile, wherein the one or more second tags are added to the content item concurrently with delivery of the content item to the user equipment;
    means for identifying a segment of the content item based on the first and second tags;
    means for determining whether the segment of the content item includes the one or more third tags;
    in response to determining the segment of the content item does not include the one or more third tags, means for storing the identified segment for use in generating meme content, wherein meme content comprises a message, and wherein the metadata for the content item indicates a popularity of memes that have been generated based on the segment of the content item; and
    in response to determining the segment of the content item includes the one or more third tags, means for preventing storage of the identified segment for use in generating meme content based on the one or more third tags indicating restricted content.

16. The system of claim 15, the system comprising means for generating for display a progress bar having a user-selectable display element corresponding to a position of the identified segment in the content item, wherein selection of the display element by a user causes the identified segment to be stored.

17. The system of claim 16, wherein the display element displays information based on at least one of the metadata for the content item and the user profile.

18. The system of claim 15, the system comprising:
    means for determining one or more user inputs at the user equipment relating to a playback operation of the content item; and
    means for storing data in the user profile relating to the one or more user inputs.

19. The system of claim 15, the system comprising:
    means for determining one or more user reactions during playback of the content item; and
    means for storing data in the user profile relating to the one or more user reactions.

20. The system of claim 15, the system comprising means for transmitting to a content provider data indicating start and end points of the identified segment.

21. The system of claim 15, the system comprising:
    upon identifying the segment of the content item based on the first and second tags, means for transmitting a recording of the identified segment to storage; and
    means for accessing from storage the identified segment at the user equipment.

22. A non-transitory computer-readable medium having non-transitory computer-readable instructions encoded thereon that, when executed by control circuitry, cause the control circuitry to:
    tag a content item with one or more first tags and one or more third tags based on metadata for the content item;
    receive at user equipment the content item having the one or more first tags and the one or more third tags;
    subsequently tag the content item with one or more second tags at the user equipment based on a user profile, wherein the one or more second tags are added to the content item concurrently with delivery of the content item to the user equipment;
    identify a segment of the content item based on the first and second tags;
    determine whether the segment of the content item includes the one or more third tags;
    in response to determining the segment of the content item does not include the one or more third tags, store the identified segment for use in generating meme content, wherein meme content comprises a message, and wherein the metadata for the content item indicates a popularity of memes that have been generated based on the segment of the content item; and
    in response to determining the segment of the content item includes the one or more third tags, prevent storage of the identified segment for use in generating meme content based on the one or more third tags indicating restricted content.

23. The non-transitory computer-readable medium of claim 22, wherein execution of the instructions causes the control circuitry to generate for display a progress bar having a user-selectable display element corresponding to a position of the identified segment in the content item, wherein selection of the display element by a user causes the identified segment to be stored.

24. The non-transitory computer-readable medium of claim 23, wherein the display element displays information based on at least one of the metadata for the content item and the user profile.

25. The non-transitory computer-readable medium of claim 22, wherein execution of the instructions causes the control circuitry to:
    determine one or more user inputs at the user equipment relating to a playback operation of the content item; and
    store data in the user profile relating to the one or more user inputs.

26. The non-transitory computer-readable medium of claim 22, wherein execution of the instructions causes the control circuitry to:
    determine one or more user reactions during playback of the content item; and
    store data in the user profile relating to the one or more user reactions.

27. The non-transitory computer-readable medium of claim 22, wherein execution of the instructions causes the control circuitry to transmit to a content provider data indicating start and end points of the identified segment.

28. The non-transitory computer-readable medium of claim 22, wherein execution of the instructions causes the control circuitry to:
  upon identifying the segment of the content item based on the first and second tags, transmit a recording of the identified segment to storage; and
  access from storage the identified segment at the user equipment.

* * * * *